Feb. 11, 1958 C. B. WALKER 2,822,690
HOLDER FOR FORCE SENSITIVE ELEMENT
Filed March 29, 1955

INVENTOR:
Charles B. Walker
BY
ATTORNEY

United States Patent Office 2,822,690
Patented Feb. 11, 1958

2,822,690

HOLDER FOR FORCE SENSITIVE ELEMENT

Charles B. Walker, San Diego, Calif., assignor to General Dynamics Corporation, San Diego, Calif., a corporation of Delaware Application March 29, 1955, Serial No. 497,765

8 Claims. (Cl. 73—431)

The present invention relates to a holder or support and more particularly to a holder or support for a force sensitive device.

In situations wherein it is important to accurately measure comparatively small forces, such as air pressures upon the skin of an aircraft, various transducer devices or strain gauges have been employed to effect the desired pressure measurements. A representative transducer, and one which is particularly suited for use with the present holder, is described and shown in U. S. Patent No. 2,636,964, issued to Joseph H. Lancor, Jr., et al., April 28, 1953. The imposition of a force or pressure upon the thin interiorly disposed diaphragm of the transducer or force sensitive element there described effects a change in the strain in the system of fine wires within the transducer. These wires are disposed in a Wheatstone bridge arrangement, and under the imposed force the strain in various of the wires tends to increase while in others the strain tends to decrease whereby the electrical resistivity of the wires is altered in proportion to the applied force or pressure. As a consequence this causes an unbalance in the bridge, which is manifested in changes in the applied voltage, these changes being generally directly measured in terms of the imposed force, such as pressure for example.

Although the plurality of wires and other components of such force sensitive elements usually adjust well to gradual changes in temperature, their adjustment to rapid fluctuations in temperatures is not as quick as is desirable. That is, under rapid temperature changes certain of the plurality of fine wires and components of the transducer absorb or transmit heat more rapidly than the other components by virtue of their different shapes, masses, and compositions, and consequently the expansion and contraction of the various components are not uniform. This dissimilarity is manifested in an unequal strain in the fine bridge wires of the transducer, and, since the transducer cannot discriminate between the strain caused in the bridge wires by temperature rather than pressure, a false pressure indication results. Thus, in order to obtain an accurate pressure reading the transducer must be protected or be able to accommodate itself to rapid fluctuations in temperature whereby all of its components or elements will expand or contract substantially uniformly.

Heretofore, efforts to neutralize or eliminate the undesirable effects of rapid fluctuations of temperature upon transducer pressure readings have been concentrated upon improvements and refinements in the transducer itself. These efforts have not been completely successful.

Accordingly, the present invention comprises a holder for the pressure measuring device or transducer, which holder is adapted by its construction to alleviate the effects of rapid temperature fluctuations by shielding or insulating the transducer therefrom and providing metallic structure for inducing uniform heat distribution about the transducer. In addition, the present holder is comparatively small, light in weight, and uniquely adapted to permit the replacement of a defective transducer simply and quickly.

Further, where the transducers are employed in situations where fuel or water may be encountered, or where other conditions are unfavorable to accurate and reliable operation of the transducer, the present device provides a means for shielding the transducer from such conditions.

It is therefore a principal object of the present invention to provide an improved holder for a force sensitive device, which holder is adapted to substantially prevent loss of accuracy in the device which might be caused by rapid fluctuations in environmental temperatures.

Another object of the invention is to provide a novel holder for a transducer which permits simple, rapid and convenient removal and replacement of the transducer when desired.

An additional object of the invention resides in the provision of an improved transducer holder for maintaining a transducer in a desired position, which holder is adapted to protect sensitive transducer components from unfavorable environmental conditions.

A further object of the invention is to provide a unique holder for a transducer, which holder is simple and easy to install, and adapted for use with a variety of conventional transducer and other measuring devices.

Other objects and features of the present invention will be readily apparent to those skilled in the art from the following specification and appended drawings wherein is illustrated a preferred form of the invention, and in which.

Figure 1:
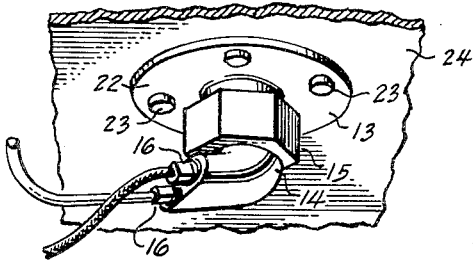
Figure 1 is a perspective view of the holder in accordance with the present invention, the holder being illustrated in association with the skin of an aircraft wing.

Referring to the drawings and more particularly to Figure 1, there is illustrated an embodiment of the holder of the present invention which is generally designated 11 and which is adapted for use in connection with an aircraft, being employed to hold a usual transducer 12 in association with the aircraft to measure external pressures acting against the aircraft. It is to be understood, of course, that the holder 11 of the present invention is adapted to hold other measuring devices, in a variety of applications, and the description of holder 11 in connection with transducer 12 is merely by way of example and not intended to be limiting in scope.

Holder 11 comprises, generally, an open-ended receptacle 13 which is secured to a bowl 14 by a nut 15; a pair of outwardly projecting connector adapters 16 associated with bowl 14 for introducing lead-in elements within bowl 14; a cup 17 and a cap assembly 18, substantially completely housed within receptacle 13 and bowl 14, and adapted for receiving transducer 12. Receptacle 13, bowl 14 and nut 15 are preferably made of metal to promote more rapid transfer of heat therethrough to provide greater uniformity of heat distribution to transducer 12, and cup 17 and cap assembly 18 are preferably substantially completely made of a suitable heat insulating material such as Micarta or the like to shield and insulate transducer 12 housed therein from rapid fluctuations in environmental temperatures.

Figure 2:
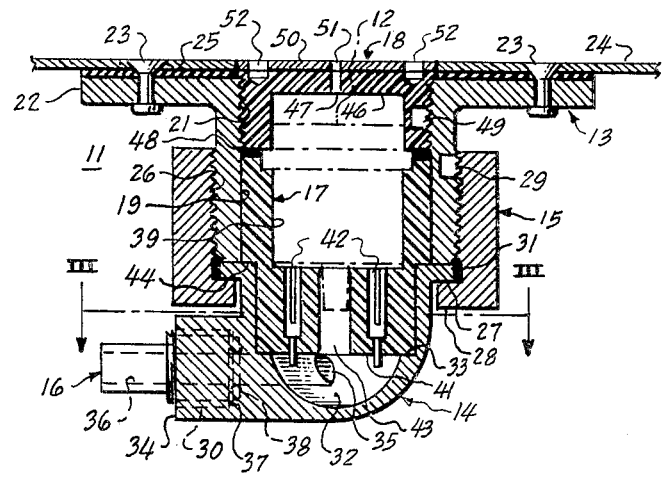
Figure 2 is an elevational view of the present holder in cross-section and on an enlarged scale.
Figure 3:
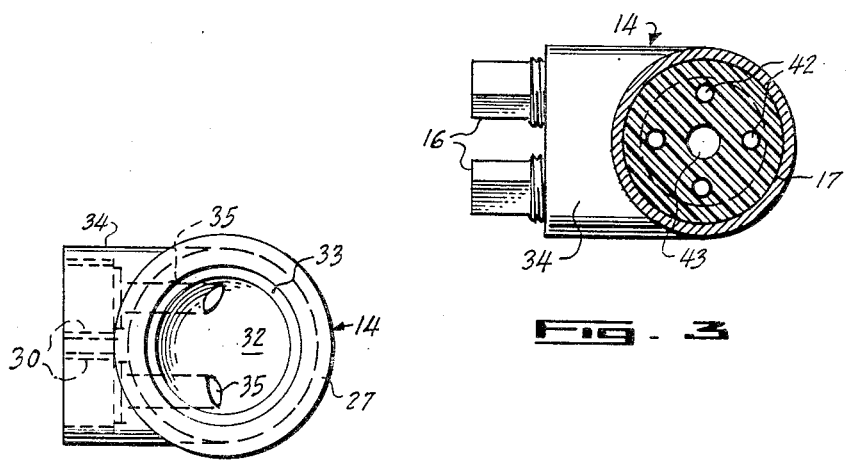
Figure 3 is a view taken along III—III of Figure 2.
Figure 4:
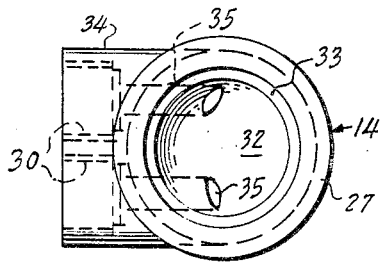
Figure 4 is a plan view of an element of the present holder.

As best illustrated in Figure 2, receptacle 13 is generally cylindrical in shape, having a central bore 19 extending therethrough for slidably receiving cup 17 and for threadably receiving cap assembly 18 at 21. Receptacle 13 embodies an integral circular flange portion 22 at its upper end, which flange portion 22 is provided with a plurality of equally spaced peripheral mounting holes which serve to receive a corresponding plurality of rivets 23 whereby receptacle 13 is fixedly secured to the undersurface of skin 24 of the aircraft. A layer of insulating, fluid-tight material 25 is preferably provided between skin 24 and flange portion 22 to reduce the amount of heat transfer from skin 24 to transducer 12, and also to provide a fluid seal between skin 24 and flange portion 22. Such a fluid seal is advantageous in a situation where holder 11 is surrounded by fluid, such as the liquid fuel in a wing tank of the aircraft. Other provisions in holder 11 for providing additional fluid seals will be described in some detail hereinafter.

Receptacle 13 is threadably connected at its lower end 26 by nut 15 to bowl 14, the lower edge of receptacle 13 being disposed in bearing against an upper circular peripheral flange 27 of bowl 14 and urged thereagainst, upon tightening of connection 26, by the action of a lower flange 28 of nut 15 against the flange 27 of bowl 14. A locking action may be imparted to the threaded connection 26, if desired, by the provision of a nylon insert 29, as is well known in the art and described in detail in U. S. Patent No. 2,520,121, issued to L. N. Brutus, August 29, 1950. In addition, a fluid seal is preferably provided between flange 27, of bowl 14, nut 15, and receptacle 13 by a usual O-ring 31 made of suitable yieldable material such as rubber disposed at the base of receptacle 13 and distorted into fluid-sealing position by the tightening action of nut 15. It is noted that bowl 14 is mounted to nut 15 by being inserted through the top of the bore of nut 15 and then tipped or tilted into position so that flange 28 of nut 15 engages flange 27 of bowl 14 to hold bowl 14 in place.

Bowl 14 embodies a central cavity 32 opening upwardly into bore 19 of receptacle 13 and forming an extension of bore 19. An interior shoulder 33 formed in the side wall of cavity 32 serves as a stop or seat for the lower end of cup 17 when it is accommodated within cavity 32. Bowl 14 includes a horizontally extending portion 34 which embodies a pair of horizontally extending passages 35 which are adapted to accommodate the lead-in elements for transducer 12. Portion 34 also embodies a pair of horizontally extending bores 30 for threadably receiving the pair of adapters 16 therein, adapters 16 themselves being provided with central bores 36 in communication with passages 35 of bowl 14 to accommodate the usual lead-in elements for transducer 12. A pair of washers 37 are preferably provided in abutment with the inner ends of adapters 16 to bear against a pair of usual O-rings 38, of yieldable sealing material, which are located between adapters 16 and bowl 14 whereby when adapters 16 are tightened into position O-rings 38 will be flattened into fluid sealing relationship with adapters 16 and bowl 14, and will be resiliently urged against the lead-in elements for transducer 12 to thereby hold such elements in position sealed against any ingress of external fluids. It is noted that adapters 16 may be provided at their external ends with square sides or the like to facilitate turning of adapters 16 by a conventional wrench, for example.

Cup 17 which fits within receptacle 13 and bowl 14 is generally cylindrical in shape, being provided with a central bore 39 which communicates with a plurality, generally four, of vertical openings through the base 41 of cup 17. These openings serve to receive a corresponding number of any usual and conventional sockets 42, which are open at their upper ends for receiving the usual prongs or pins protruding from the lower end of transducer 12, and which sockets 42 are adapted at their lower ends to receive, by soldering or the like, the inner ends of the usual electrical lead-in elements or wires for transducer 12 which are preferably disposed through a first one of the pair of adapters 16. Sockets 42 are press fitted into position, and are, as stated, of conventional construction, and by expandably receiving the transducer pins serve to hold transducer 12 in position against the base 41 of cup 17. In addition to the openings for sockets 42, base 39 is also provided with a central opening 43 therethrough which is adapted to receive the usual central bored protuberance which extends from transducer 12, which protuberance defines a connecting passage from the interior of transducer 12 to the exterior at the lower end of opening 43 of base 41. This passage, as is well known in the art, permits the standard and known pressure of a remote manifold (not shown) to be carried to and to act upon the interior side of the usual diaphragm of transducer 12 through the usual pressure lead-in element generally disposed through the second one of the pair of adapters 16, through a corresponding opening 35 in bowl 14, and into cavity 32 which is in communication with the passage in the lower protuberance of transducer 12. In this manner, external pressure acting against the external or opposite side of the diaphragm of transducer 12 may be conveniently calculated in usual manner by compensating the pressure indication effected by transducer 12 for the known manifold pressure being applied against the internal side of the transducer diaphragm.

Cup 17 is slidably fitted at its lower portion within bowl 14, and includes a larger diameter upper portion which is slidably fitted within bore 19 of receptacle 13, a peripheral shoulder 44 which is formed by such larger diameter being adapted to seat upon flange 27 of bowl 14 to provide support for cup 17. Cup 17 includes at its upper edge an inner peripheral shelf 45 which is adapted to receive and support the usual peripheral flange which is characteristic of transducer 12, the transducer being slidably fitted within bore 39 of cup 17.

Skin 24 of the aircraft includes a suitable circular opening which is in alignment with and substantially the same diameter as bore 19 of receptacle 13 whereby transducer 12 and cap assembly 18 may be inserted through skin 24 from the outside into association with the interior of holder 11. It is particularly noted that by this construction transducer 12 may be replaced as desired without the necessity of removing any part of holder 11 from skin 24 except cap assembly 18.

Cap assembly 18 is cylindrical in shape and open at its lower end to slidably accommodate the upper portion of transducer 12, the closed upper portion 46 being provided with a comparatively small central hole 47 which serves to admit external pressure into the interior of assembly 18 to act against the diaphragm of transducer 12. The lower edge of assembly 18 is adapted to seat upon the usual peripheral flange of transducer 12 to thereby restrain transducer 12 against movement, it being noted that a generous clearance is provided between transducer 12 and upper portion 46 of assembly 18 to thereby avoid possible injury to the sensitive diaphragm of transducer 12. A conventional O-ring 48 is preferably provided between the lower edge of assembly 18 and the upper edge of cup 17 whereby when assembly 18 is urged downwardly a fluid seal will be effected between assembly 18, cup 17, and the flange of transducer 12.

The threaded connection 21 between assembly 18 and receptacle 13 serves to maintain assembly 18 in position, and a nylon insert 49 or the like, similar to insert 29 for threaded connection 26, may be set into a suitable seat in assembly 18 to effect a locking action, as is well known.

A comparatively thin metal disk 50 with a central opening 51 is bonded to the upper surface of assembly 18 by using any suitable adhesive, it being noted that disk 50 and the associated components of holder 11 are designed so that upon assembly of holder 11 disk 50 will be flush with skin 24 and in snug fitting relation with the opening through skin 24, with its central opening 51 aligned with the hole 47 of portion 46 to provide communication from the interior of assembly 18 to the atmosphere. In addition, a pair of tooling openings 52 extend through disk 50 and portion 46 of assembly 18 to enable assembly 18 to be turned for insertion or removal thereof, a suitable tool being employed which is adapted to mate with and be disposed within openings 52. Disk 50 is preferably made of metal, which is generally more resistant to abrasion and to undesirable enlargement of openings 52 through use than is the insulating material of the rest of assembly 18. In addition, the metal of disk 50 is useful in reflecting radiant energy to assist in protecting transducer 12 from extreme temperatures.

Thus holder 11 is adapted to alleviate the effects of rapid changes in environmental temperatures; it is small and compact, simple in construction, and it provides a seal between transducer 12 and external fluids, such as aircraft fuel. Further, the unique construction of holder 11 permits simple and rapid replacement of a transducer 12 as desired.

While certain preferred embodiments of the invention have been specifically disclosed, it is understood that the invention is not limited thereto as many variations will be readily apparent to those skilled in the art and the invention is to be given its broadest possible interpretation within the terms of the following claims:

I claim:

1. A holder for a force sensitive element, said holder comprising receptacle means for housing said element, insulating means positioned within said receptacle means, said insulating means comprising a generally cup-shaped member and an insulating cap removably secured to said receptacle means and cooperating with said cup-shaped member to enclose said force sensitive element to substantially insulate said element against rapid fluctuations in environmental temperatures which may act upon said holder.

2. A holder for a force sensitive element, said holder comprising enclosing means for housing said element, insulating means releasably fitted within said enclosing means, said insulating means comprising a generally cup-shaped member, an insulating cap threadably connected to said enclosing means, and fluid sealing means between said cup-shaped member and said cap, said cup-shaped member and said cap cooperating to enclose said force sensitive element to substantially insulate said element against rapid fluctuations in environmental temperatures which may act upon said enclosing means.

3. A transducer holder comprising a receptacle, a generally bowl-shaped element forming with said receptacle an enclosure open at one end, connecting means for securing together said receptacle and said bowl-shaped element, an insulating cup disposed within said enclosure at its closed end, and an insulating cap removably disposed within said enclosure and closing the open end thereof, said cup and cap forming together a closed container for a transducer.

4. A transducer holder comprising an open-ended receptacle adapted for connection to one side of a support member in alignment with an opening provided in said support member, a generally bowl-shaped element forming with said receptacle an enclosure open at one end, connecting means for securing together said receptacle and said bowl-shaped element, an insulating cup disposed within said enclosure at its closed end, an apertured insulating cap removably disposed within said enclosure and closing the open end thereof, said cup and said cap forming together a container for a transducer, and heat reflecting means secured to the exterior of said cap and provided with an opening in communication with the aperture of said cap and the opening in said plate member for enabling pressure on the side of said support member opposite said receptacle to act upon said transducer.

5. A transducer holder comprising an open-ended receptacle adapted for connection to the internal side of a plate member and in communication with an opening provided in said plate member, a generally bowl-shaped element forming with said receptacle an enclosure open at one end, connecting means for securing together said receptacle and said bowl-shaped element, an insulating cup disposed within said enclosure at its closed end, and an apertured insulating cap adapted for disposition within said enclosure in threadable association with said receptacle for closing the open end of said enclosure, said cup and said cap forming together a container for a transducer, said cap being adapted for removal through the opening in said plate member whereby said transducer may be removed from said transducer holder from the external side of said plate member.

6. A transducer holder comprising a receptacle, a generally bowl-shaped member forming an enclosure with said receptacle, connecting means for securing together said receptacle and said bowl-shaped element, an insulating cup embodying seating means and disposed within said enclosure, and an insulating cap embodying seating means and disposed within said enclosure in association with said insulating cup to form a container for receiving a transducer to substantally insulate said transducer against rapid fluctuations in environmental temperatures, said seating means of said cup and said seating means of said cap serving to grip and maintain said transducer in fixed position.

7. A transducer holder comprising a heat conducting receptacle adapted for connection to the inner side of a plate member, a heat conducting generally bowl-shaped member forming an enclosure with said receptacle, heat conducting connecting means for securing together said receptacle and said bowl-shaped element, a heat insulating cup embodying seating means and disposed within said enclosure, an insulating cap embodying seating means and disposed within said enclosure in association with said insulating cup to form a container for receiving a transducer, said seating means of said cup and said seating means of said cap serving to grip and maintain said transducer in position, and sealing means between said insulating cup and said insulating cap for sealing off said transducer from pressures on the inner side of said plate member.

8. A transducer holder comprising an open-ended receptacle adapted for connection to the inner side of a plate member provided with an opening, a generally bowl-shaped element forming with said receptacle an enclosure open at one end, connecting means for securing together said receptacle and said bowl-shaped element, a heat insulating cup embodying seating means and disposed within said enclosure at its closed end, an apertured insulating cap embodying seating means and disposed within said enclosure in association with said insulating cup to close the open end of said enclosure and to form a container for receiving a transducer, said seating means of said cup and said seating means of said cap serving to grip and maintain said transducer in position, and sealing means between said insulating cup and said insulating cap for sealing off said transducer from pressures on the inner side of said plate member, pressures on the outer side of said plate member being permitted to act upon said transducer through the opening in said plate member and the apertures in said cap.

References Cited in the file of this patent

UNITED STATES PATENTS

| | | |
|---|---|---|
| 2,180,176 | Stone | Nov. 14, 1939 |
| 2,250,471 | Bruin | July 29, 1941 |
| 2,453,549 | Statham | Nov. 9, 1948 |
| 2,720,113 | Statham | Oct. 11, 1955 |
| 2,737,051 | Sanderson | Mar. 6, 1956 |

FOREIGN PATENTS

| | | |
|---|---|---|
| 704,248 | Great Britain | Feb. 17, 1954 |